(12) United States Patent
Juan-Castellanos et al.

(10) Patent No.: US 8,537,394 B2
(45) Date of Patent: Sep. 17, 2013

(54) PRINTER AND SCALE WITH INITIALIZATION PROCESS FOR SELECTING RFID FREQUENCY BAND FOR COMMUNICATING WITH RFID LABELS

(75) Inventors: Santos Juan-Castellanos, Falcon Heights, MN (US); John A. Dusing, Mason, OH (US); Bryan S. Combs, Kettering, OH (US)

(73) Assignee: Premark FEG L.L.C., Glenview, IL (US)

( * ) Notice: Subject to any disclaimer, the term of this patent is extended or adjusted under 35 U.S.C. 154(b) by 266 days.

(21) Appl. No.: 12/825,860

(22) Filed: Jun. 29, 2010

(65) Prior Publication Data
US 2011/0317178 A1 Dec. 29, 2011

(51) Int. Cl.
*G06F 3/12* (2006.01)

(52) U.S. Cl.
USPC ......... 358/1.15; 358/420; 358/412; 358/1.18; 358/1.5; 235/375; 235/472.02; 235/462.46; 340/10.4; 340/10.51; 340/10.52; 340/10.1

(58) Field of Classification Search
USPC ......... 340/10.51, 10.52, 10.1, 10.4; 235/375, 235/472.02, 462.46; 358/420, 412, 1.15, 358/1.18, 1.5
See application file for complete search history.

(56) References Cited

U.S. PATENT DOCUMENTS

| | | | |
|---|---|---|---|
| 6,317,027 B1 | 11/2001 | Watkins | |
| 6,551,414 B2 | 4/2003 | Reichold | |
| 7,009,515 B2 | 3/2006 | Carrender | |
| 7,023,341 B2 | 4/2006 | Stilp | |
| 7,221,278 B2 | 5/2007 | Chiu et al. | |
| 7,497,384 B2 | 3/2009 | Powell et al. | |
| 2005/0030201 A1 | 2/2005 | Bridgelall | |
| 2006/0068701 A1 | 3/2006 | Chapman et al. | |
| 2006/0139662 A1* | 6/2006 | Sugiyama | 358/1.5 |
| 2006/0158316 A1 | 7/2006 | Eckstein | |
| 2007/0005379 A1* | 1/2007 | Juan-Castellanos et al. | 705/1 |
| 2007/0013485 A1* | 1/2007 | Edwards et al. | 340/10.5 |
| 2007/0029386 A1 | 2/2007 | Jessup | |
| 2008/0084310 A1 | 4/2008 | Nikitin et al. | |

FOREIGN PATENT DOCUMENTS

EP 1675039 6/2006

OTHER PUBLICATIONS

PCT, International Search Report and Written Opinion, International Application No. PCT/US2011/039557 (Sep. 13, 2011).

* cited by examiner

*Primary Examiner* — Benny Q Tieu
*Assistant Examiner* — Quyen V Ngo
(74) *Attorney, Agent, or Firm* — Thompson Hine LLP

(57) ABSTRACT

A control associated with a label printer and RF unit is operable to carry out an RFID frequency selection process in which: (a) a given label is moved into the certain location along the label path; (b) for each of a plurality of frequencies: (i) the RF unit is operated to attempt to read and/or write to the label RFID tag of the given label multiple times; and (ii) the control records success data for attempts made in (b)(i); and (c) the control identifies and selects for subsequent use in operation of the RFID unit a multiplicity of the plurality of frequencies based upon results obtained in steps (b)(i) and (b)(ii).

20 Claims, 5 Drawing Sheets

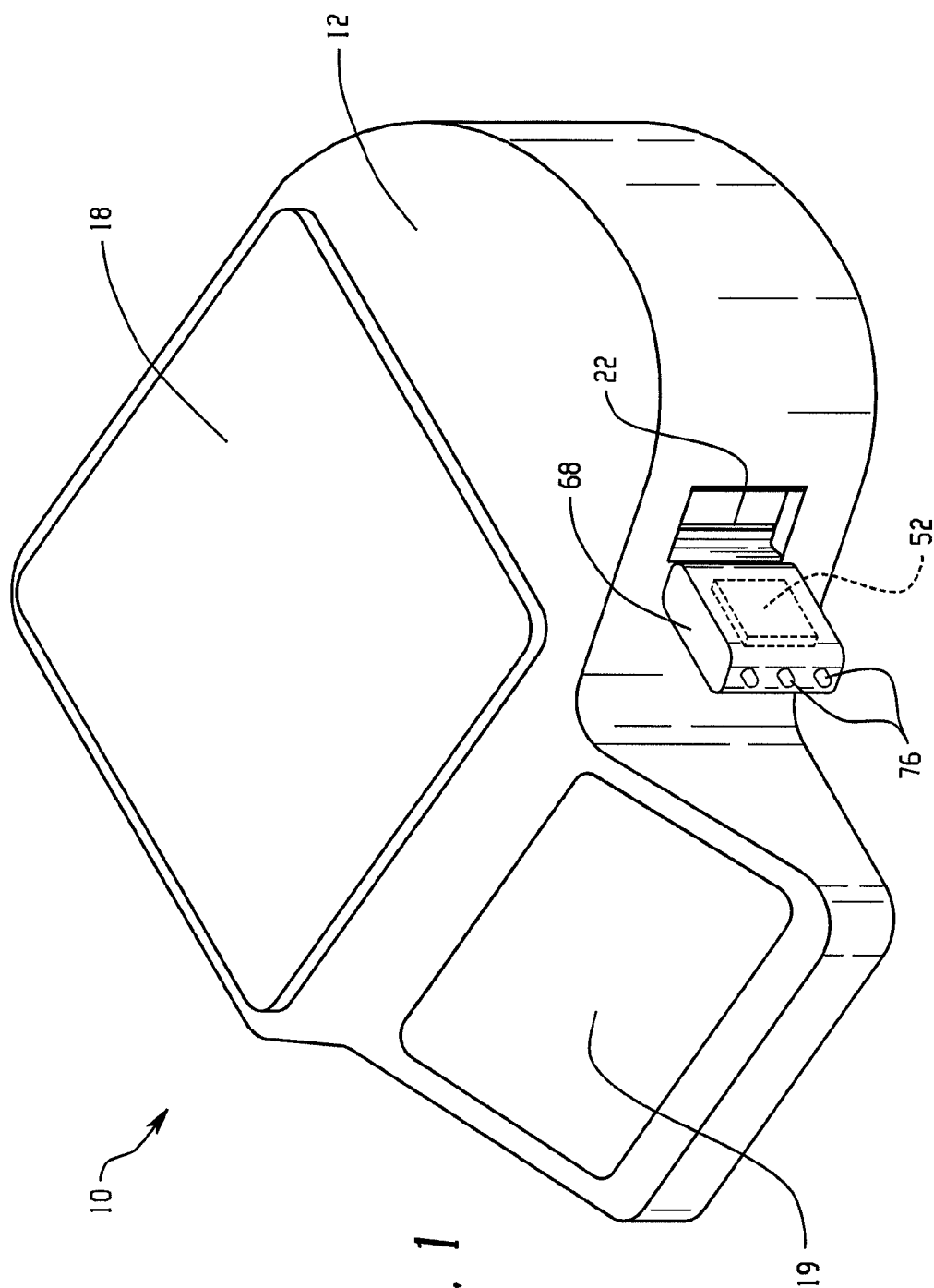

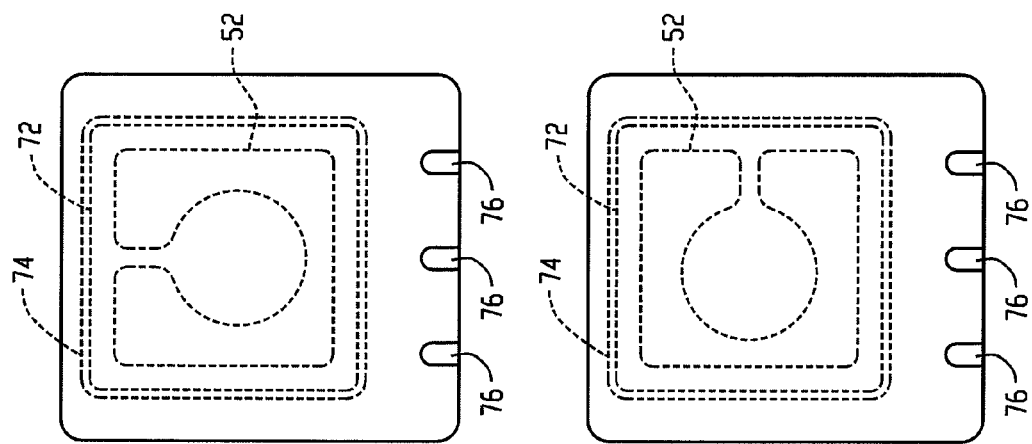
Fig. 5A
Fig. 5B
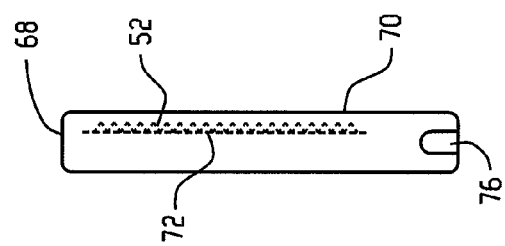
Fig. 4
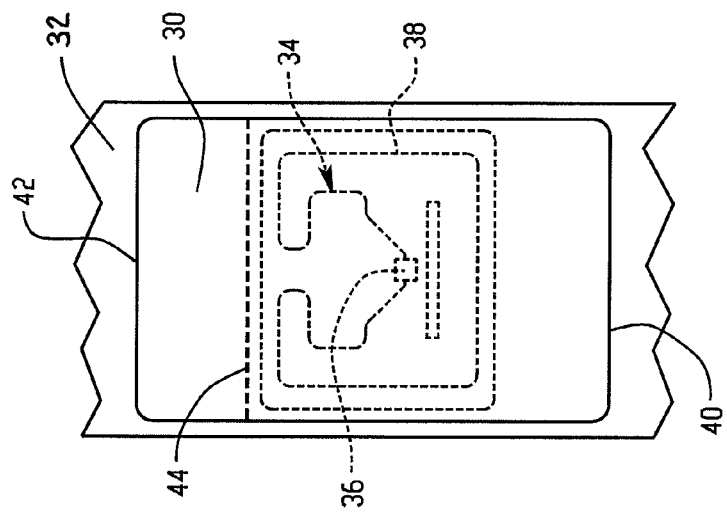
Fig. 3

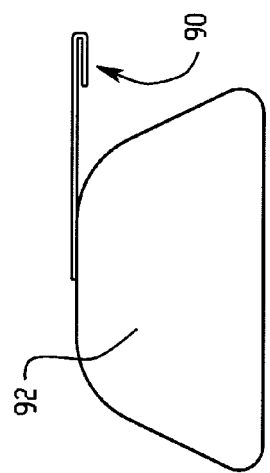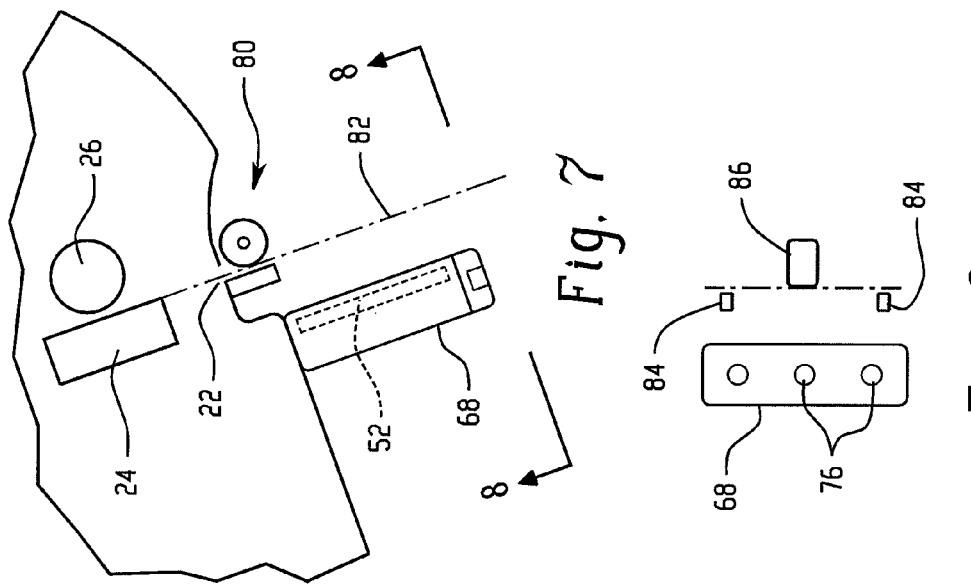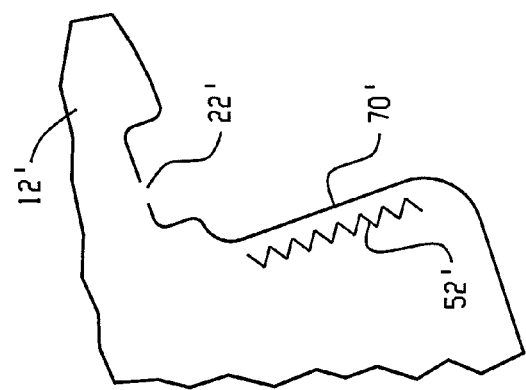

PRINTER AND SCALE WITH INITIALIZATION PROCESS FOR SELECTING RFID FREQUENCY BAND FOR COMMUNICATING WITH RFID LABELS

TECHNICAL FIELD

This application relates generally to printers and scales of the type commonly used in groceries and supermarkets for weighing and/or pricing items in the nature of food products such as meats and produce and, more particularly, to printers and scales incorporating RFID label functionality and a initialization process for selecting operating frequencies for RFID read and/or write operations.

BACKGROUND

Perishable food departments, such as deli departments in stores, commonly utilize slicers to slice food product and scales to weigh and print labels for the sliced food product. Scales are also used in conjunction with other food items. Currently the scales print labels with a bar code that can be scanned by a bar code scanner at checkout. With the development of RFID tags, there is a need for a printer and/or scale operable with such RFID tags. PCT International Publication No. WO 2005/004071 A1 discloses an exemplary scale operable with labels having RFID tags. U.S. patent application Ser. No. 12/492,809, file Jun. 26, 2009, commonly owned by the assignee of the present application, is incorporated herein by reference and also discloses an RFID scale system operable with labels having RFID tags.

The effectiveness of RFID communications in such devices can vary with different device tolerances as well as the environment in which the scale or printer is placed. Accordingly, it would be desirable to provide a RFID printer system, scale-based or otherwise, that is capable of providing effective RFID communications notwithstanding such tolerance or environment differences.

SUMMARY

In one aspect, a label printing mechanism for handling labels with associated RFID tags includes a label path extending from a label supply location, and a print head located along the label path for printing indicia on labels passing thereby. An RF unit is located for reading and/or writing from and/or to label RFID tags on labels, the RF unit including an antenna located in a position to be proximate to label RFID tag antennas when labels are at a certain location along the label path. A control is associated with the label printer and RF unit for operation thereof. The control is operable to carry out an RFID frequency selection process in which: (a) a given label is moved into the certain location along the label path; (b) for each of a plurality of frequencies that are separated by a defined frequency step: (i) the RF unit is operated to read and/or write to the label RFID tag of the given label multiple times; and (ii) the control records whether each read and/or write operation is effective; (c) the control identifies and selects for subsequent use in operation of the RFID unit a multiplicity of the plurality of frequencies based upon results obtained in steps (b)(i) and (b)(ii).

In another aspect, a control associated with a label printer and RF unit is operable to carry out an RFID frequency selection process in which: (a) a given label is moved into a certain location along a label path; (b) for each of a plurality of frequencies: (i) the RF unit is operated to attempt to read and/or write to the label RFID tag of the given label multiple times; and (ii) the control records success data for attempts made in (b)(i); and (c) the control identifies and selects for subsequent use in operation of the RFID unit a multiplicity of the plurality of frequencies based upon results obtained in steps (b)(i) and (b)(ii).

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1 is perspective view of one embodiment of a label printing mechanism in the form of a scale;

FIG. 3 is a partial view of an exemplary label supply;

FIG. 4 is a side elevation view of an RF encoder unit antenna housing structure;

FIGS. 5A and 5B show respective plan views of the antenna housing structure with two possible antenna board orientations;

FIG. 6 is a partial view of a label printer embodiment incorporating the RF encoder unit antenna within the printer housing;

FIG. 7 is a partial schematic view of a corrugator mechanism located external of the label output slot;

FIG. 8 is a partial elevation view along line 8-8 of FIG. 7;

FIG. 9 is a side elevation view of a folded RFID tag label adhesively applied to a package.

DETAILED DESCRIPTION

Figure 2A:
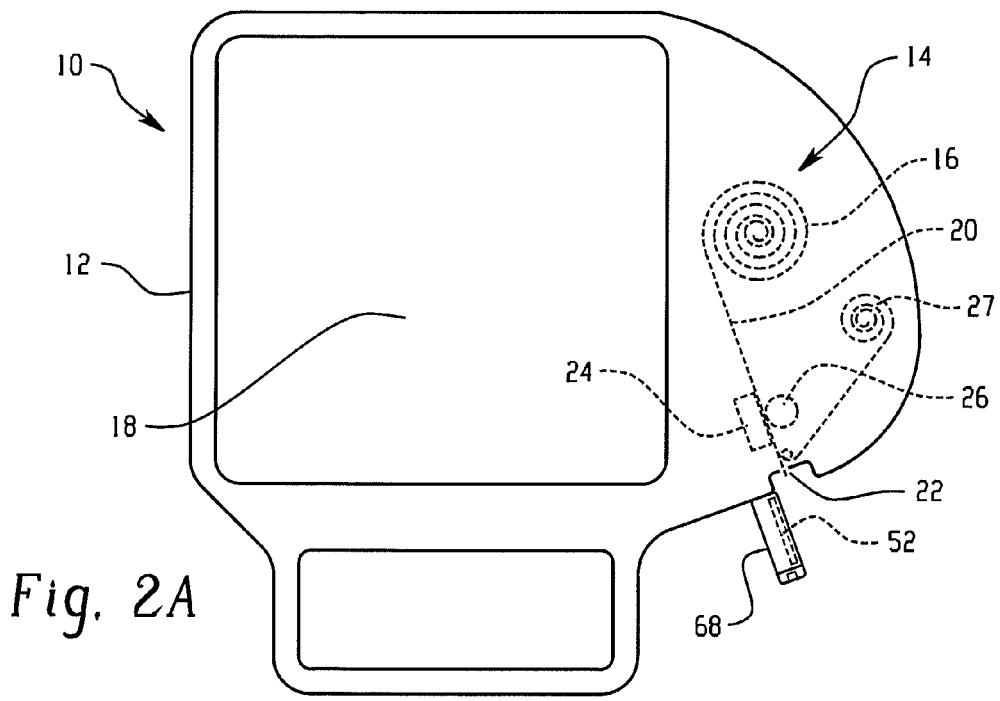
FIG. 2A is a schematic view of the scale of FIG. 1.
Figure 2B:
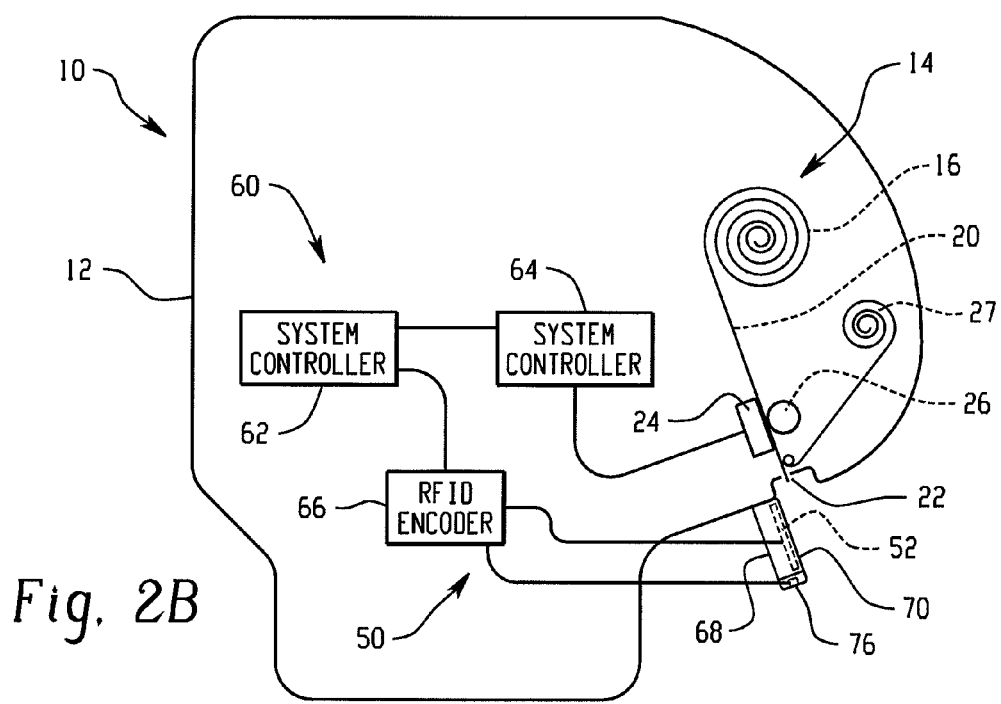
FIG. 2B is a schematic view of the control system of the scale of FIG. 1.

Referring to FIGS. 1, 2A and 2B, perspective and schematic views of one embodiment of a label printing mechanism in the form of a scale 10 is shown. The scale includes a housing 12 and a label supply location 14 within the housing for holding a supply of labels 16. A weighing station 18 is located on the housing for receiving items to be weighed. The weighing station is linked to an associated load cell that produces weight indicative signals. A user interface 19 (e.g., in the form of a touch screen display, array of buttons or other suitable form) is provided.

A label path 20 extends from the label supply location 14 to a label output slot 22 of the housing. A print head 24 and associated pressure roller 26, that acts as the label feed mechanism and drives the label stock, are located within the housing along the label path for printing indicia on labels passing thereby. After passing between the print head 24 and pressure roller 26, the label stock is passed sharply around a pin and the label is separated from the release liner and moves to the label output slot while the release liner travels to a take up roll location 27.

Referring to FIG. 3, the label supply may take the form of a roll of adhesive labels 30 on a release liner 32. Each label includes an associated RFID tag 34 thereon. Each RFID tag includes an RFID chip 36 connected to an antenna 38 (e.g., in the form of an inlay). The RFID tags, specifically the antennas, are generally planar and may be attached at the adhesive side of labels so as to be located adjacent the release surface of the release liner before the label is removed from the liner. The labels may be arranged in the scale such that edge 40 is the leading edge of the label and edge 42 is the trailing edge of the label. The label RFID tag is located a set distance from a trailing edge 42 of the label to facilitate desired positioning of the RFID tag antenna. In this manner, regardless of a length of the label being used, the RFID tag antenna will always be placed in a proper position for reading and/or writing if the label is fed out of the label output slot to a position where only a small portion of the trailing edge of the label is held between the print head 24 and pressure roller 26 as described in more detail below. The labels may include a side edge to side edge extending fold line 44 (e.g., in the form or a score or set of perforations) to facilitate folding of the label before applying it to a package.

Referring again to FIGS. 1, 2A and 2B, an RF encoder unit 50 for reading and/or writing from and/or to label RFID tags on labels is provided. The RF encoder unit 50 includes an antenna 52 located in a position to be proximate to label RFID tag antennas when labels are in a certain position, in this case a position in which part of the label exited the housing 12 through the label output slot 22. A control 60 is associated with the label printer and RF unit. The illustrated control 60 includes a system controller 62 and printer controller 64, which may be located on a common board. The system controller 62 communicates with the control board 66 of the RF encoder, which is in turn connected to the antenna 52.

The control is also associated with the weighing station for receiving weight information. In one implementation, during a typical label production operation, the control calculates price for a weighed item and effects printing of the price on a label by the print head and encoding, by the RF unit, of at least the price and/or a serial number to an RFID tag of the label.

In the illustrated embodiment, the RF encoder unit antenna 52 is located external of the housing 12 and within a separate antenna housing structure 68 that includes a generally planar portion 70 located alongside the label exit path from the label output slot 22. As shown in FIG. 4, the RF encoder unit antenna 52 may be located on an antenna board 72 within the antenna housing 68. In one implementation, the antenna board is adapted to be rotated between at least a first orientation (FIG. 5A) for use in association with labels having one label antenna orientation and a second orientation (FIG. 5B) for use in association with labels having a different label antenna orientation. In this regard, the antenna board may be square and the antenna housing may include a square receiving area 74 for the antenna board to facilitate such rotation while maintaining proper placement of the board and antenna within the housing 68.

The housing may also incorporate one or more light elements 76 (e.g, in the form of LEDs) which are selectively energized to provide status indications to the scale operator. In the illustrated embodiment three different light elements (e.g., having respective colors of green, yellow and red) are provided. By way of example, one indicator light may (e.g., yellow) be energized for communicating a busy status of the RF encoder unit, another indicator light (e.g., green) may be energized for communicating a label ready status upon successful completion of a label read and/or write operation and the third indicator light (e.g., red) may be energized for communicating an error status when the label read and/or write operation has failed.

In an alternative embodiment shown in the partial schematic of FIG. 6, the scale housing 12' may include a generally planar portion 70' extending outwardly along one side of the label output slot 22', and the RF encoder unit antenna 52' may be located within the housing and adjacent the generally planar portion of the housing. In the case of either embodiment, the RF unit antenna should be located far enough from the label supply location within the housing to prevent inadvertent reading and/or writing to label RFID tags on labels within the housing.

Referring to FIGS. 7 and 8, a corrugator mechanism 80 is located at the external side of the label exit slot for placing a bend in the exiting label along a bend axis 82 that is parallel to a travel direction of the label as it exits. The bend prevents curling of the label away from the RF unit antenna 52. In the illustrated embodiment the corrugator includes spaced apart slides or guides 84 to one side of the label and a roller 86 to the opposite, adhesive side of the label. However, other corrugator configurations are possible.

During a label production operation, the control 60 may operate such that a printed label is partially fed out of the label exit opening 22 so as to place label RFID tag antenna 34 proximate the RF encoder unit antenna 52. In this position, a trailing edge of the label is held between the print head 24 and pressure roller 26 so as to prevent an operator from easily removing the label before a read and/or write operation is completed. Only after a label read and/or write operation by the RF encoder unit has been successfully completed does the control 60 effect completion of the label feed out (e.g., to a position such that no part of the label is held between the print head 24 and pressure roller 26).

An exemplary label production method using a label printer such as that described above involves producing a pricing label by moving a given label past the print head and printing product specific information on the label. In one implementation, label images may be produced and utilized for printing that include a no print region that aligns with the label RFID tag chip 36 to avoid poor print quality that can occur around the edges of the chip.

After printing, the given label is moved at least partially out of the label output slot and stopped to place an antenna of the RFID tag of the given label external of the label output slot and in field range of the antenna of the RF encoder unit. In one implementation, as previously mentioned, the given label is moved only partially out of the label output slot and is stopped. Then a read and/or write operation from and/or to the RFID tag of the given label is performed using the antenna of the RF encoder unit.

Upon successful completion of the reading and/or writing step, a first of the light elements is illuminated, and/or a first audible signal is produced, to indicate that the given label is ready to be applied to a package and, as appropriate, the label may be moved further out of the label output slot into a label ready position.

On the other hand, upon unsuccessful completion of the reading and/or writing step, a second of the light elements is illuminated, and/or a second audible signal is produced, to indicate that the reading and/or writing step failed. Additionally, upon unsuccessful completion of the reading and/or writing step, voiding of the given label may be achieved by printing a void indication on the given label. Subsequent to the voiding step, the label production steps may automatically be initiated in attempt to complete a successful label production operation. In one implementation, the voiding step includes moving the given label backward to the print head, printing the void indication and then outputting the given label. In another implementation the voiding step involves printing a void indication at the trailing edge of the label without moving the label backward.

Upon successful completion of the reading and/or writing step, the label is removed from the scale/printer and applied to a product. The application may be completed manually or using an automated label applier (e.g., such as that used in automated weighing and wrapping machines). Where the label is provided with a fold line that is located proximate to an edge of the antenna of the RFID tag, the label may be folded along the fold line to provide a non-adhesive label portion that encompasses a substantial portion of the antenna of the given label, and the folded label applied to the product such that the non-adhesive label portion extends freely from the product (e.g., see folded label portion 90 extending from product 92 in FIG. 9). By overhanging the label portion 90, which incorporates a substantial portion of the label antenna 34, the chance of product within the package (e.g., particularly high moisture content product) interfering with RF signal reaching the label antenna 34 (e.g., when attempting to read the label antenna 34 at a point-of-sale) is reduced.

Where the scale/label printer includes a label taken sensor (e.g., a reflective photosensor arrangement) the control 60 may maintain the green light element in an energized state until the label is removed, at which point the green light element may be deenergized.

In connection with attempting to assure consistent and successful reading and/or writing to labels, the controller 62 is operable (e.g., programmed or otherwise configured) to carry out an RFID frequency selection process. In this regard, communications in RF systems such as that described are often carried out utilizing a frequency hopping technique that is mandated by applicable FCC or other regulations or requirements. In a frequency hopping technique communications are required to take place by jumping between some defined, minimum number of frequencies, which reduces interference. One problem encountered is choosing a set of frequencies that will work well for the given installation. The RFID frequency selection process used herein provides a mechanism for beneficial selection of the frequencies.

Figure 10:
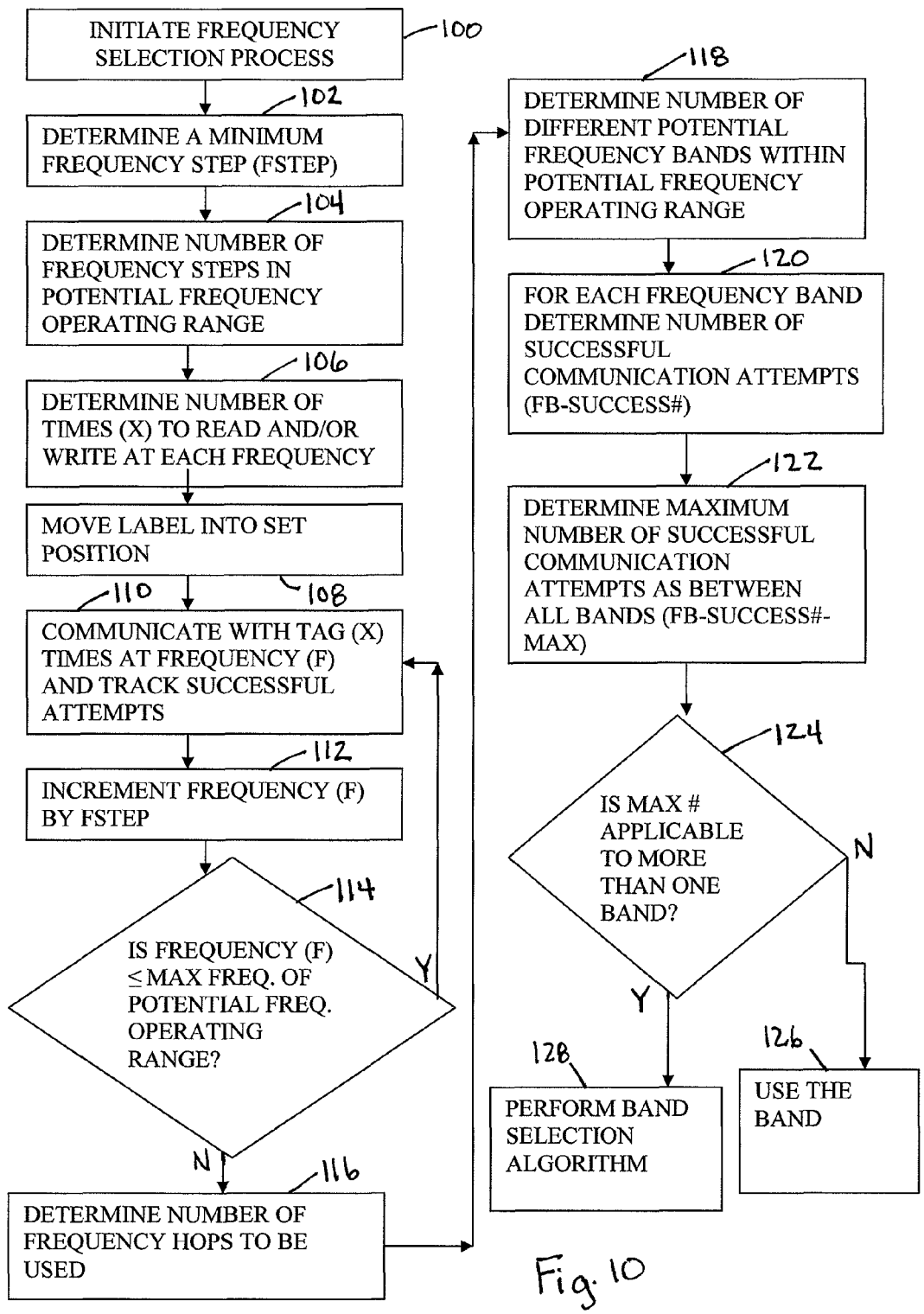
FIG. 10 is a flowchart depicting a frequency selection process.

Referring to FIG. 10, an exemplary flow chart for one embodiment of an RFID frequency selection process is shown. At step 100 the frequency selection process is initiated. In one implementation, the initiation may be triggered manually (e.g., by a scale operator selecting an initialization sequence via the user interface. However, other options are possible. For example, the initiation may be triggered by one or more of time (e.g., every hour), tracking of number of labels output since a last RFID frequency band selection process (e.g., after every 100 labels), powering on of the device; detection of insertion of a new label roll or detection of a label cassette insert operation.

At step 102 a minimum frequency step between frequencies is determined. In one implementation, this minimum frequency step may be predefined in memory of the controller. Alternatively, the controller may be configured to communicate with a remote computer to obtain the step information. At step 104 the number of frequency steps in the potential operating frequency is determined. In one implementation, this number may be predefined in memory. In another implementation the number may be calculated by subtracting a lowest frequency of a predefined potential frequency operating range from the highest frequency of the range and dividing by the frequency step. At step 106 a determination is made as to the number of times (e.g., 50, 100 etc.) to read and/or write at each frequency for purpose of the selection process. Again, this number may be predefine in memory, accessed from a remote device or may be user definable via the interface.

In step 108, a label is moved into a set position corresponding the proper position for reading and/or writing by the label RFID unit antenna 52. The label is preferably stopped and maintained in the set position during the subsequent communication attempts at multiple frequencies. In this regard, at step 110 the label RFID unit attempts to communicate at a start frequency (F) with the RFID tag of the label the number of times (X) determined in step 106, and tracks the number of successful attempts.

In the illustrated embodiment, the start frequency F is the lowest frequency of the potential frequency operating range. However, the highest frequency could be used. Moreover, while the illustrated embodiment contemplates a sequential progression through the potential frequencies, it is possible that a non-sequential progression through the available frequencies could be used.

In one implementation, each communication attempt may be effected by carrying out a select tag communication message according to a defined tag communication protocol. However, variations are possible. In terms of tracking successful communication attempts, the controller could simply add the number of successful attempts and store the total in association with the frequency being tested. In an alternative implementation, the controller could store each successful and unsuccessful attempt in a table.

At step 112, the frequency (F) is incremented by the frequency step. At step 114, if the frequency (F) is less than or equal to the maximum frequency of the potential frequency operating range, the process loops back to step 110. If the frequency (F) is greater than the maximum frequency of the potential frequency operating range (meaning all potential frequencies have been tested), then processing moves on to step 116 where a number of frequency hops (e.g., the minimum number required) that will be used during normal RFID tag communications is determined (e.g., retrieved from memory or a remote computer or input via the user interface), and the number of potential bands available in the potential frequency operating range is determined in step 118.

At step 120, for each frequency band a total number of successful communication attempts is determined (e.g., by adding the number of successful communication attempts at each frequency in the band). The controller may store the total number of each band.

By way of example, if the minimum operating frequency of a potential band is 902 MHz, the maximum operating frequency is 927 MHz and the frequency step is 2.5 KHz, then there will be 10,000 potential frequencies available in the range. If the minimum number of frequency hops is 100, then there will be 9,900 potential sequential frequency bands that could be selected from among the range.

At step 122, the maximum or highest number of successful attempts per band is determined. If there is only one sequential band that has the highest number, as determined at step 124, then that sequential band is selected for subsequent use RFID tag communications at step 126. On the other hand, if more than one band has the highest success number then a band selection algorithm 128 may be implemented.

The band selection algorithm 128 could vary. In one implementation the algorithm could simply select the band that falls closest to the middle of all bands that have the highest success number. In another implementation the algorithm could seek to identify sequential groupings of bands that all have the highest success number, identify the sequential grouping that has the largest number of bands and then select for use the band that falls in the middle of the grouping with the largest number of bands. Of course, other variations are possible.

It is to be clearly understood that the above description is intended by way of illustration and example only, is not intended to be taken by way of limitation, and that other changes and modifications are possible. For example, while the described embodiment focuses on identification of a plurality of sequential frequencies to form a sequential band of frequencies for use in RFID communications, it is contemplated that an alternative arrangement could select a plurality of frequencies that are not necessarily sequential as the collection or group of frequencies to be used for RFID communications.

What is claimed is:

1. A label printing mechanism for handling labels with associated RFID tags, the mechanism comprising:
   a label path extending from a label supply location;
   a print head located along the label path for printing indicia on labels passing thereby;
   an RF unit for reading and/or writing from and/or to label RFID tags on labels, the RF unit including an antenna located in a position to be proximate to label RFID tag antennas when labels are at a certain location along the label path; and
   a control associated with the label printer and RF unit for operation thereof, the control operable to carry out an RFID frequency selection process in which:
      (a) a given label is moved into the certain location along the label path;
      (b) for each of a plurality of frequencies that are separated by a defined frequency step:
         (i) the RF unit is operated to read and/or write to the label RFID tag of the given label multiple times; and
         (ii) the control records whether each read and/or write operation is effective;
      (c) the control identifies and selects for subsequent use in operation of the RFID unit a multiplicity of the plurality of frequencies based upon results obtained in steps (b)(i) and (b)(ii).

2. The label printing mechanism of claim 1 wherein the multiplicity of the plurality of frequencies include some frequencies that are not sequential.

3. The label printing mechanism of claim 1 wherein in step (c) the control selects a sequential band of the plurality of frequencies.

4. The label printing mechanism of claim 3 wherein in step (c) the control considers multiple different sequential bands of the plurality of frequencies and selects for use the sequential band that meets a defined criteria.

5. The label printing mechanism of claim 4 wherein the defined criteria is a best performance criteria among the multiple different sequential bands.

6. The label printing mechanism of claim 5 wherein the best performance criteria is defined by overall number of successful read and/or write operations in each sequential band.

7. The label printing mechanism of claim 6 wherein if more than one of the multiple different sequential bands has a same highest overall number of successful read and/or write operations, a band selection algorithm is carried out as between the multiple different sequential bands having the same highest overall number of successes.

8. The label printing mechanism of claim 4 wherein each sequential band is made up of a predefined number the plurality of frequencies.

9. The label printing mechanism of claim 1 wherein in step (b) the control operates to start at a lowest or highest one of the plurality of frequencies and moves sequentially through the plurality of frequencies performing operations (b)(i) and b(ii) until a highest or lowest one of the plurality of frequencies is reached.

10. The label printing mechanism of claim 1 wherein the control is configured such that the RFID frequency selection process is carried out based upon at least one of (i) an initialization process of the label printing apparatus being manually triggered, (ii) a timed basis, (iii) tracking of number of labels output since a last RFID frequency selection process, (iv) the label printing apparatus being powered ON; (v) detection of insertion of a new label roll or (vi) detection of a cassette insert operation.

11. A scale incorporating the label printing mechanism of claim 1, the scale further including a weighing station for weighing items.

12. A label printing mechanism for handling labels with associated RFID tags, the mechanism comprising:
   a label path extending from a label supply location;
   a print head located along the label path for printing indicia on labels passing thereby;
   an RF unit for reading and/or writing from and/or to label RFID tags on labels, the RF unit including an antenna located in a position to be proximate to label RFID tag antennas when labels are at a certain location along the label path; and
   a control associated with the label printer and RF unit for operation thereof, the control operable to carry out an RFID frequency selection process in which:
      (a) a given label is moved into the certain location along the label path;
      (b) for each of a plurality of frequencies:
         (i) the RF unit is operated to attempt to read and/or write to the label RFID tag of the given label multiple times; and
         (ii) the control records success data for attempts made in (b)(i);
      (c) the control identifies and selects for subsequent use in operation of the RFID unit a multiplicity of the plurality of frequencies based upon results obtained in steps (b)(i) and (b)(ii).

13. The label printing mechanism of claim 12 wherein the multiplicity of the plurality of frequencies include some frequencies that are not sequential.

14. The label printing mechanism of claim 12 wherein in step (c) the control selects a sequential band of the plurality of frequencies.

15. The label printing mechanism of claim 12 wherein in step (c) the control identifies frequencies that satisfy a defined criteria.

16. The label printing mechanism of claim 15 wherein the defined criteria is a best performance criteria.

17. The label printing mechanism of claim 12 wherein the control is configured such that the RFID frequency selection process is carried out based upon at least one of (i) an initialization process of the label printing apparatus being manually triggered, (ii) a timed basis, (iii) tracking of number of labels output since a last RFID frequency selection process, (iv) the label printing apparatus being powered ON; (v) detection of insertion of a new label roll or (vi) detection of a cassette insert operation.

18. A scale incorporating the label printing mechanism of claim 12, the scale further including a weighing station for weighing items.

19. A label printing mechanism for handling labels with associated RFID tags, the mechanism comprising:
   a label path extending from a label supply location;
   a print head located along the label path for printing indicia on labels passing thereby;
   an RF unit for reading and/or writing from and/or to label RFID tags on labels, the RF unit including an antenna located in a position to be proximate to label RFID tag antennas when labels are at a certain location along the label path; and a control associated with the label printer and RF unit for operation thereof, the control configured to carry out an RFID frequency selection process in which:
  (a) a given label is moved into the certain location along the label path;
  (b) while the given label remains in the certain location, for each of a plurality of frequencies:
    (i) the RF unit is operated to attempt to read and/or write to the label RFID tag of the given label multiple times; and
    (ii) the control records success data for the frequency based upon attempts made in (b)(i);
  (c) the control identifies and selects for use in operation of the RFID unit a multiplicity of the plurality of frequencies based upon the success data recorded for each frequency in step (b)(ii);
the control configured such that subsequent to step (c) the control implements RFID read and/or write operations for tags utilizing frequency hopping, wherein the frequency hopping is limited to hopping between the multiplicity of frequencies identified and selected in step (c).

20. The label printing mechanism of claim 19 wherein the control is configured such that in step (c) the control selects a sequential band of the plurality of frequencies as the multiplicity of the plurality of frequencies, wherein the control considers multiple different sequential bands of the plurality of frequencies and selects for use the sequential band that meets a best performance criteria among the multiple different sequential bands.

* * * * *